UNITED STATES PATENT OFFICE.

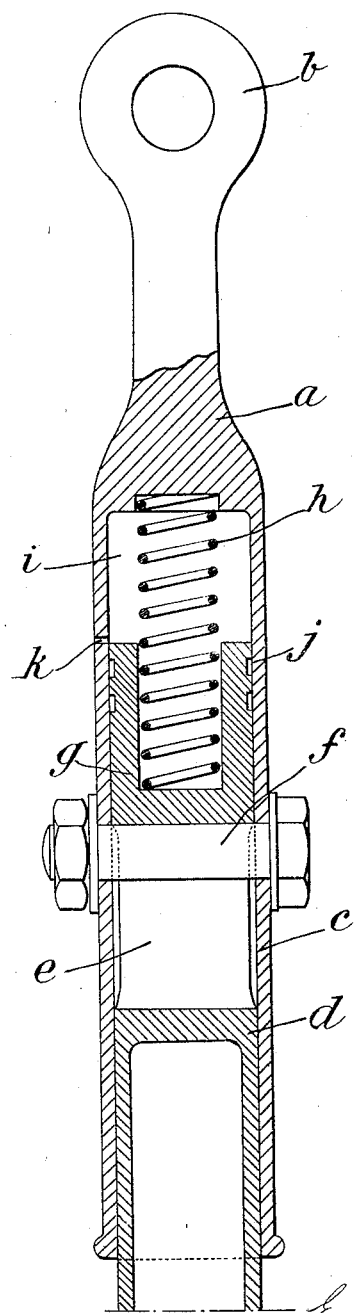

EMILE JOSEPH AUGUSTIN SCHULTZ, OF PARIS, FRANCE.

ELASTIC ROD FOR MOTORS.

1,385,758.  Specification of Letters Patent.  Patented July 26, 1921.

Application filed September 24, 1918. Serial No. 255,513.

(GRANTED UNDER THE PROVISIONS OF THE ACT OF MARCH 3, 1921, 41 STAT. L., 1313.)

*To all whom it may concern:*

Be it known that I, EMILE JOSEPH AUGUSTIN SCHULTZ, a citizen of the Republic of France, residing in Paris, France, have invented certain new and useful Improvements in Elastic Rods for Motors, of which the following is a specification.

In the cylinder of an internal combustion engine, when the exhaust stroke is finished, there is always an appreciable volume between the end of the cylinder and the rear face of the piston. It follows that the burnt gases are not completely evacuated so that in the following phase there is a smaller charge than there might be and a high final temperature when this charge has been expanded, both results diminishing the output of the engine.

This invention relates to an elastic connecting rod formed of two parts sliding one within the other at one end and at the other ends connected respectively with the parts to be joined by the connecting rod. The chamber formed by the end of the inner part and by the walls of the outer part is so packed as to make a substantially air-tight joint and contains a spring which presses the parts apart. During the final part of the compression stroke and during combustion the spring is compressed and the imprisoned air is also compressed; at this time consequently there exists between the piston and the end of the cylinder a correspondingly increased cubic capacity. On the other hand during the exhaust period no pressure is exerted on the piston and the connecting rod is fully extended, the piston traveling as closely as possible to the bottom of the cylinder and evacuating the whole of the burnt gases.

An embodiment of the invention is shown in the accompanying drawing, which represents an elastic connecting rod particularly useful for a rotary engine.

The part $a$ comprising the eye $b$ of the connecting rod is formed as a tube $c$ in which is adapted to slide the other part $d$ of the connecting rod. To limit the sliding movement the part $d$ is slotted to receive a bolt $f$ which extends through the tube $c$. At one end of the sliding movement this bolt comes in contact with the end $g$ of the slot and stops the part $c$ from further outward movement which may be caused by centrifugal force and by spring $h$. In the inner direction the sliding movement is limited by the compression of the air confined in chamber $i$ formed between the end of the part $d$ and the bottom of the cylindrical space $c$ containing the spring $h$.

In order to avoid leakage of air, the consequence of which would be that the parts $c$ and $d$ would come suddenly into contact, there is made a labyrinthine passage $j$ in the periphery of the piece $d$ in the parts of which the air expands in succession. Furthermore, there is a port $k$ in the wall of the part $c$ in a position corresponding with the end of the outward movement, so that the air in chamber $i$ is restored to atmospheric pressure in the event of a slight loss.

When the connecting rod is applied to a rotary engine, the chamber $i$ is hermetically closed, for the oil which is introduced into this chamber for lubricating the rubbing surfaces is by virtue of the centrifugal force, thrown to the upper part of the chamber, so that it prevents any escape between $c$ and $d$ of the air compressed in the lower part of the chamber $i$.

This elastic connecting rod operates as follows:—During the compression phase there arrives a moment when the gases balance the forces which hold the piston rod extended. In the case of a rotary cylinder engine these forces are centrifugal force, proportional to the mass of the piston, the force of the counter-spring $h$, and the expansion force of the air in chamber $i$. The first of these forces is constant when the speed is constant, the second is practically always constant but the third increases very rapidly and by virtue of the air-tight closure of the chamber is opposed to the force which would cause a blow or contact between the surfaces limiting the contraction of the rod. The combustion occurs and the connecting rod remains compressed but at the same time that the gases expand in the cylinder the spring $h$ expands, returning to the crank the force which it has stored; the next cycle then begins. The explosive force of the combustion is transmitted to the crank through the compressed air cushion, thereby avoiding shocks and vibration.

It should be noted that at the beginning of the admission owing to the extremely small volume between the piston and the end of the cylinder there is a much more energetic suction of the fresh gases than is the case when ordinary connecting rods are used; the charge taken in is thus increased by use of the elastic connecting rod. It is evident therefore that the device improves the specific output of the engine which is a great advantage in aeroplane engines. Obviously, however, the invention is applicable to any internal combustion engine and the construction may be modified in detail to suit each particular case.

Having thus fully described the nature of my invention and the best means I know of carrying the same into practical effect, I claim:—

1. In an internal combustion engine, a telescopic connecting rod, comprising two parts adapted to slide one within the other at one end, means connecting the other ends with the parts respectively which are to be joined by the connecting rod, a spring between the sliding ends adapted to press them apart, said rod having an air chamber within the sliding ends, and packing between said parts to make a substantially air tight joint, the said spring being adapted to expand the connecting rod in order to drive the cylinder to the extreme end of the piston during the exhaust stroke and the said air chamber being adapted by compression of the confined air to cushion the contraction of the rod at the end of the compression stroke and at the moment of ignition.

2. A connecting rod according to claim 1, having a vent port to the air chamber in position to be opened at the extreme elongation of the rod to admit air to replace loss by leakage.

In witness whereof, I have hereunto signed my name.

EMILE JOSEPH AUGUSTIN SCHULTZ.

Witnesses:
JOHN F. SIMONS,
HENRI CARTIER.